(12) United States Patent
Al-Duwaish et al.

(10) Patent No.: US 8,346,711 B2
(45) Date of Patent: *Jan. 1, 2013

(54) METHOD FOR IDENTIFYING MULTI-INPUT MULTI-OUTPUT HAMMERSTEIN MODELS

(75) Inventors: Hussain N. Al-Duwaish, Dhahran (SA); Syed Z. Rizvi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 557 days.

This patent is subject to a terminal disclaimer.

(21) Appl. No.: 12/591,603

(22) Filed: Nov. 24, 2009

(65) Prior Publication Data

US 2011/0125684 A1    May 26, 2011

(51) Int. Cl.
G06F 15/00 (2006.01)
G06F 15/18 (2006.01)

(52) U.S. Cl. .......... 706/62; 706/45; 706/46; 706/47; 700/28; 700/29; 700/30; 700/47

(58) Field of Classification Search .......... None
See application file for complete search history.

(56) References Cited

U.S. PATENT DOCUMENTS

| | | | |
|---|---|---|---|
| 5,706,400 A | | 1/1998 | Omlin et al. |
| 6,047,221 A * | | 4/2000 | Piche et al. ............ 700/44 |
| 6,381,504 B1 * | | 4/2002 | Havener et al. ............ 700/44 |
| 6,487,459 B1 * | | 11/2002 | Martin et al. ............ 700/44 |
| 6,516,309 B1 | | 2/2003 | Eberhart et al. |
| 6,950,711 B2 * | | 9/2005 | Havener et al. ............ 700/28 |
| 7,039,475 B2 | | 5/2006 | Sayyarrodsari et al. |
| 7,272,454 B2 | | 9/2007 | Wojsznis et al. |
| 7,418,301 B2 | | 8/2008 | Boe et al. |
| 7,496,414 B2 * | | 2/2009 | Boe et al. ............ 700/44 |
| 2003/0018399 A1 | | 1/2003 | Havener et al. |
| 2005/0033122 A1 | | 2/2005 | Balkin et al. |
| 2005/0196047 A1 | | 9/2005 | Owechko et al. |
| 2007/0019865 A1 | | 1/2007 | Owechko et al. |
| 2007/0142975 A1 | | 6/2007 | Piche |
| 2008/0071397 A1 | | 3/2008 | Rawlings et al. |
| 2008/0208778 A1 | | 8/2008 | Sayyar-Rodsari et al. |
| 2008/0293372 A1 * | | 11/2008 | Principe et al. ............ 455/334 |

OTHER PUBLICATIONS

Van Overschee et al. "N4SID: Subspace algorithms for the identification of combined deterministic-stochastic systems", Automatica, special issue on statistical processing and control, 1992, pp. 1-50.*

Giri et al. "Hammerstein model identification" Proceedings fof the 10th mediterranean conference on control and automation, 2002, 9 pages.*

Gomez et al. "Subspace identification of multivariable hammerstein and wiener models", IFAC, 2002, 6 pages.*

Kennedy et al. "Particle swarm optimization", IEEE, 1995, pp. 1942-1948.*

(Continued)

*Primary Examiner* — Omar Fernandez Rivas
(74) *Attorney, Agent, or Firm* — Richard C. Litman

(57) ABSTRACT

The method for the identifying of multiple input, multiple output (MIMO) Hammerstein models that includes modeling of the linear dynamic part of a Hammerstein model with a state-space model, and modeling the nonlinear part of the Hammerstein model with a radial basis function neural network (RBFNN).

7 Claims, 16 Drawing Sheets

OTHER PUBLICATIONS

Al-Duwaish et al. "Use of multilayer feedforward neural networks in identification and control of wiener model", IEEE, 1996, pp. 255-258.*

Nelles et al. "Identification of non-linear dynamic systems—Classical methods versus radial basis function networks", Proceedings of the american control conference, 1996, pp. 3786-3790.*

Naitali et al. "Hammerstein and Wiener nonlinear models identification using multimodal particel swarm optimizer" Proceedings of the 2006 American control conference, 2006, pp. 2363-2368.*

Lin et al. "A mew identification method for Hammerstein model based on PSO", IEEE, 2006, pp. 2184-2188.*

Liu et al. "Nonlinear system identification of Hammerstein and Wiener model using swarm intelligence", IEEE, 2006, pp. 1219-1223.*

Hou, "Hammerstein model identification based on adaptive particle swarm optimization", Workshop on intelligent information technology application, 2007, pp. 137-140.*

Salahshoor et al., "A new on-line subspace-based identification algorithm for multivariable Hammerstein models", IEEE, 2008, pp. 4748-4753.*

* cited by examiner

METHOD FOR IDENTIFYING MULTI-INPUT MULTI-OUTPUT HAMMERSTEIN MODELS

BACKGROUND OF THE INVENTION

1. Field of the Invention

The present invention relates to Hammerstein models, and particularly to a computerized method for identifying multi-input multi-output (MIMO) Hammerstein models for engineering design applications.

2. Description of the Related Art

The Hammerstein Model belongs to a family of block oriented models, and is made up of a memoryless nonlinear part followed by a linear dynamic part. It has been known to effectively represent and approximate several industrial processes, such as, for example, pH neutralization processes, distillation column processes, and heat exchange processes. Hammerstein models have also been used to successfully model nonlinear filters, biological systems, water heaters, and electrical drives.

A significant amount of research has been carried out on identification of Hammerstein models. Systems can be modeled by employing either nonparametric or parametric models. Nonparametric representations involve kernel regression or expansion of series, such as the Volterra series. This results in a theoretically infinite number of model parameters, and is therefore represented in terms of curves, such as step responses or bode diagrams. Parametric representations, such as state-space models, are more compact, as they have fewer parameters and the nonlinearity is expressed as a linear combination of finite and known functions.

Development of nonlinear models is the critical step in the application of nonlinear model based control strategies. Nonlinear behavior is prominent in the dynamic behavior of physical systems. Most physical devices have nonlinear characteristics outside a limited linear range. In most chemical processes, for example, understanding the nonlinear characteristics is important for designing controllers that regulate the process. It is rather difficult, yet necessary, to select a reasonable structure for the nonlinear model to capture the process nonlinearities. The nonlinear model used for control purposes should be as simple as possible, warranting minimal computational load and, at the same time, retaining most of the nonlinear dynamic characteristics of the system. The following convention has been used in what follows: upper case variables in bold represent matrices, lower case bold variables represent vectors, and lower case regular (i.e., non-bold) variables represent scalar quantities.

Many model structures have been proposed for the identification of nonlinear systems. The nonlinear static block followed by a dynamic block in the Hammerstein structure has been found to be a simple and effective representation for capturing the dynamics of typical chemical engineering processes such as distillation columns and heat exchangers, for example. Nonlinear system identification involves the following tasks: Structure selection, including selection of suitable nonlinear model structures and the number of model parameters; input sequence design, including the determination of the input sequence u(t) which is injected into the system to generate the output sequence y(t); noise modeling, which includes the determination of the dynamic model which generates the noise input w(t); parameter estimation, which includes estimation of the remaining model parameters from the dynamic system data u(t) and y(t), and the noise input w(t); and model validation, including the comparison of system data and model predictions for data not used in model development.

Hammerstein systems can be modeled by employing either nonparametric or parametric models. Nonparametric models represent the system in terms of curves resulting from expansion of series, such as the Volterra series or kernel regression. In practice, these curves are sampled, often leading to a large number of parameters. Parametric representations, such as state-space models, are more compact and have fewer parameters, while the nonlinearity is expressed as a linear combination of finite and known functions. In parametric identification, the Hammerstein model is represented by the following set of equations:

$$y(t) = -a_1 y(t-1) - \ldots - a_n y(t-n) + b_o v(t) + \ldots + b_m v(t-m) \quad (1)$$

$$v(t) = c_1 u(t) + c_2 u^2(t) + \ldots + c_L u^L(t) \quad (2)$$

where v(t) describes the nonlinearity, L is the order of the nonlinearity, and y(t) and u(t) are the outputs and inputs of the system.

In MIMO Hammerstein models, as noted above, a nonlinear system is represented as a nonlinear memory-less subsystem f(.), followed by a linear dynamic part. The input sequence u(t) and the output sequence y(t) are accessible to measurements, but the intermediate signal sequence v(t) is not. As shown in FIG. 1B, the static nonlinear element scales the inputs u(t) and transforms these inputs to v(t) through a nonlinear arbitrary function f(u). The dynamics of the system are modeled by a linear transfer function, whose outputs are y(t).

Many different techniques have been proposed for the black-box estimation of Hammerstein systems from input-output measurements. These techniques mainly differ in the way that static nonlinearity is represented and in the type of optimization problem that is finally obtained. In parametric approaches, the static nonlinearity is expressed in a finite number of parameters. Both iterative and non-iterative methods have been used for determination of the parameters of the static-nonlinear and linear-dynamic parts of the model. Typical techniques, however, are extremely costly in terms of computational time and energy.

Additionally, most techniques designed to deal with Hammerstein models focus purely on single-input single-output (SISO) models. Identification of MIMO systems, however, is a problem which has not been well explored. Identification based on prediction error methods (PEM), for example, is a complicated function of the system parameters, and has to be solved by iterative descent methods, which may get stuck into local minima. Further, optimization methods need an initial estimate for a canonical parametrization model; i.e. models with minimal numbers of parameters, which might not be easy to provide.

It has been shown that this minimal parametrization can lead to several problems. PEM have, therefore, inherent difficulties with MIMO system identification. More recent studies have also shown that maximum likelihood criterion results in a non-convex optimization problem in which global optimization is not guaranteed. Subspace identification methods (SIM) do not need nonlinear optimization techniques, nor do these methods need to impose to the system a canonical form. Subspace methods therefore do not suffer from the inconveniences encountered in applying PEM methods to MIMO system identification. Thus, it would be desirable to make use of this advantage, modeling the linear dynamic subsystem of the Hammerstein model with a state-space model rather than polynomial models. Thus, a method for identifying multi-input multi-output Hammerstein models solving the aforementioned problems is desired.

SUMMARY OF THE INVENTION

The present invention relates to the identification of multi-input multi-output (MIMO) Hammerstein models and, in particular, to a method utilizing a particle swarm optimization (PSO) subspace algorithm. The inventive method includes modeling of the linear dynamic part of a Hammerstein model with a state-space model, and modeling the nonlinear part of the Hammerstein model with a radial basis function neural network (RBFNN). Accurate identification of a Hammerstein model requires that output error between the actual and estimated systems be minimized, thus the problem of identification is, in essence, an optimization problem. The PSO-subspace algorithm of the present method is an optimization algorithm. Particle swarm optimization (PSO), typically known for its heuristic search capabilities, is used for estimating the parameters of the RBFNN. Parameters of the linear part are estimated using a numerical algorithm for subspace state-space system identification (N4SID).

The present method includes the following steps: (a) estimating an initial set of state space matrices A, B, C, and D using nonlinear data acquired from the plant (these matrices are estimated using the methods of subspace identification); (b) initializing a swarm of particles with a random population of possible radial basis function neural network weights; (c) initializing a particle swarm optimization method with a random population of possible radial basis function neural network weights; (d) calculating a global best set of weights which minimizes an output error measure; (e) estimating sets of radial basis function neural network outputs v(t) for all values of t based upon the global best set of weights; (f) estimating the state-space matrices A, B, C, and D from the radial basis function neural network outputs estimated in step (e) and a set of original system outputs y(t) for values of t; (g) calculating a set of system outputs ŷ(t) from the estimated state-space matrices A, B, C, and D in step (f); (h) calculating the output error measure; and (i) repeating steps (c) to (h) if the calculated output error measure is greater than a pre-selected threshhold error measure.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to the identification of MIMO Hammerstein models and, in particular, to a method utilizing a particle swarm optimization (PSO) subspace algorithm. The method includes modeling of the linear dynamic part of a Hammerstein model with a state-space model, and modeling the nonlinear part of the Hammerstein model with a radial basis function neural network (RBFNN). Accurate identification of a Hammerstein model requires that output error between the actual and estimated systems be minimized, thus the problem of identification is, in essence, an optimization problem. The PSO-subspace algorithm of the present method is an optimization algorithm. Particle swarm optimization (PSO), typically known for its heuristic search capabilities, is used for estimating the parameters of the RBFNN. Parameters of the linear part are estimated using a numerical algorithm for subspace state-space system identification (N4SID).

Figure 3:
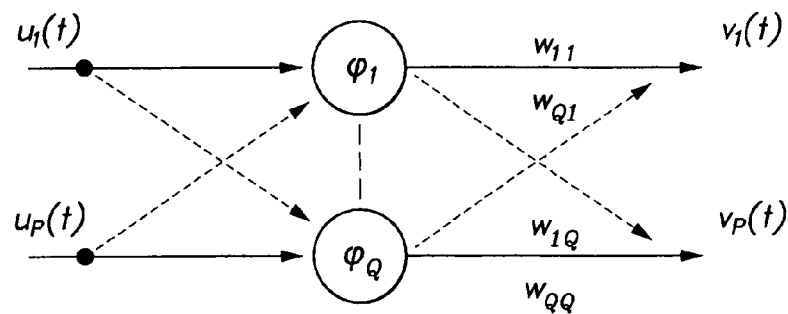
FIG. 3 is a diagrammatic representation of a radial basis function neural network.

As noted above, the linear dynamic part of the Hammerstein model is modeled by a state-space model. The static nonlinear part of the Hammerstein model is modeled using RBFNN. The external inputs to the system u(t) are fed to the RBFNN, as best illustrated in FIG. 3. The output generated by RBFNN v(t) acts as the input to the state-space system, which translates the inputs to system outputs y(t). The intermediate data between the non-linear and linear parts is inaccessible to measurements.

Particularly, considering a MIMO Hammerstein system with p inputs and r outputs, the input layer of the RBFNN takes the system inputs $u(t)=[u_1(t) \ldots u_p(t)]^T$ and the second layer of the RBFNN, referred to as the "hidden layer", performs a fixed nonlinear transformation on this data using the basis function $\phi$. The output layer of the RBFNN then implements a linear weightage and supplies the response of the network to the output $v(t)=[v_1(t) \ldots v_p(t)]^T$. Thus, the only adjustable parameters in the RBFNN are the weights of its output layer. This output, v(t) is fed to the linear subsystem whose output is given by:

$$x(t+1)=Ax(t)+Bv(t)+s(t) \quad (3a)$$

$$\hat{y}(t)=Cx(t)+Dv(t)+z(t) \quad (3b)$$

where $v(t) \in \mathfrak{R}^{P \times 1}$ and $\hat{Y}(t) \in \mathfrak{R}^{R \times 1}$ are the vectors for p inputs and r outputs of the linear subsystem observed at discrete time instant t. Vector $z(t) \in \mathfrak{R}^{R \times 1}$ is called the measurement noise and $s(t) \in \mathfrak{R}^{n \times 1}$ is called the process noise, where n denotes the order of the linear subsystem. Both z(t) and s(t) are zero mean, white noise sequences, which have covariance matrices given by:

$$E\left[\binom{s}{z}(s^T \ z^T)\right] = \begin{bmatrix} Q & S \\ S^T & r \end{bmatrix}\delta_{pq} \quad (4)$$

where E denotes expected value and $\delta_{pq}$ denotes a Kronecker delta function.

Accurate identification of a Hammerstein model requires that the error between the outputs of the actual and estimated systems be minimized. If $y(t)=[y_1(t)]^T$ denotes the vector for original outputs of the sampled data, and $\hat{y}(t)=[\hat{y}_1(t) \ldots \hat{y}_r(t)]^T$ denotes the vector for the outputs of the estimated system, then a cost function based on the square of the output error is sought to be minimized, with the cost function being given by:

$$I = \sum_{t=1}^{N} e^T(t)e(t) \quad (5)$$

where N denotes the number of data points, $e(t)=[e_1(t) \ldots e_r(t)]^T$ is the vector for output error at discrete time instant t, and is given by $e(t)=Y(t)-\hat{Y}(t)$.

The PSO plays a large part in training the RBFNN. In a swarm of particles, where each particle represents a candidate value for the weight of RBFNN output layer, the fitness of the particles is the reciprocal of the cost index given in equation (5). Hence, the smaller the sum of output errors, the more fit are the particles. Based on this principle, the PSO updates the position of all the particles moving towards an optimal solution for the weights of RBFNN.

Hammerstein identification is, therefore, solved as an optimization problem in which PSO is used to estimate the parameters of RBFNN, while parameters of the linear subsystem are estimated using the N4SID numerical subspace algorithm. RBFNN is an effective type of neural network that has proved useful in applications such as function approximation and pattern recognition. It should be noted that the static nonlinearity in a MIMO Hammerstein model can be either combined or separate.

Figure 1A:
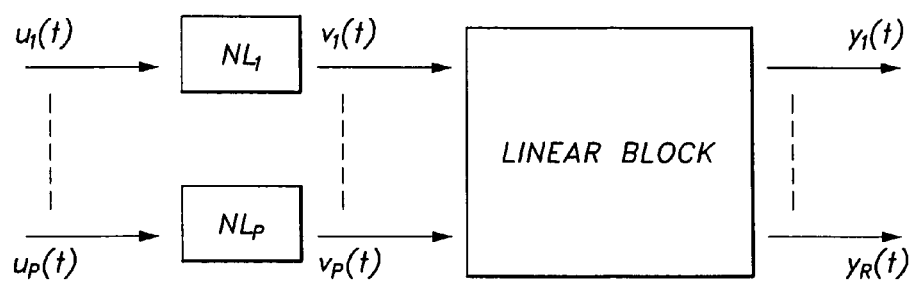
FIG. 1A is a diagrammatic representation of a Hammerstein model with separate nonlinearities.
Figure 1B:
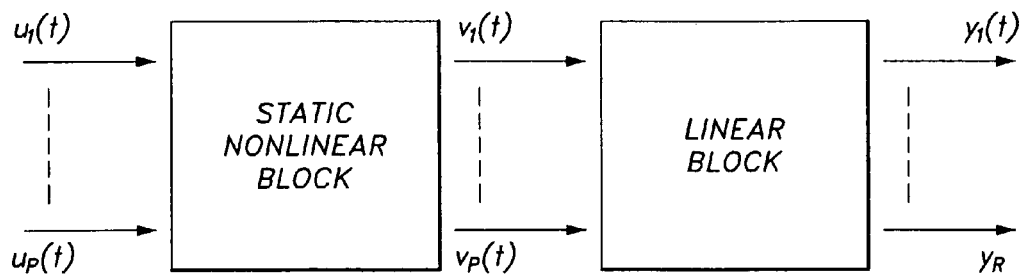
FIG. 1B is a diagrammatic representation of a Hammerstein model with combined nonlinearities.
Figure 2:
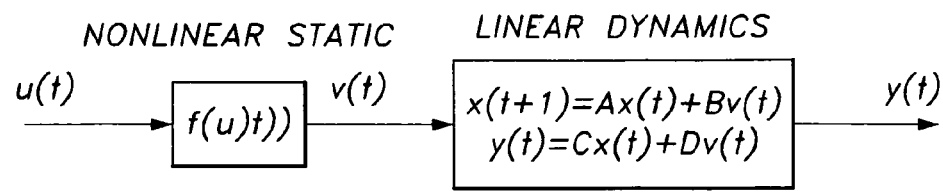
FIG. 2 is a diagrammatic overview of a general Hammerstein model.

FIGS. 1A and 1B show two Hammerstein models, both having p inputs and r outputs. In the system of FIG. 1A, each input to the linear subsystem is a function of a separate nonlinear function. Every nonlinearity is therefore approximated by a separate RBF network. FIG. 3 illustrates an RBFNN with three layers having Q neurons in the hidden layer. The input layer connects the network to its environment. The second layer performs a fixed nonlinear transformation using basis functions. The output layer linearly weighs the response of the network to the output. Thus, the $j^{th}$ nonlinear output $v_j(t)$ would depend only on $u_j(t)$, and would be modeled by the RBFNN as:

$$v_j(t) = \sum_{i=1}^{Q} w_i \phi \| u_j(t) - c_i \| \quad (6)$$

where Q is the number of neurons in the hidden layer, $c_i$ is the center for the $i^{th}$ neuron of that layer, $w_i$ is the weight connecting the $i^{th}$ neuron node to the output layer, $\phi$ is the radial basis function, and ||.|| denotes the norm.

In the second system of FIG. 1B, the nonlinearity is combined, and therefore the effect of all the inputs is reflected over every nonlinear output $v_j(t)$. For a similar network having Q neurons in the hidden layer, the equation for the $j^{th}$ nonlinear output $v_j(t)$ in this case is given by:

$$v_j(t) = \sum_{i=1}^{Q} w_{ij} \phi \| u(t) - c_i \| \quad (7)$$

where $u(t) \in \mathfrak{R}^{p \times 1}$ is the input vector for the system shown in FIG. 1B at discrete time t.

Subspace identification is used for estimating the parameters of the linear dynamic part of the model; i.e., the matrices of the state-space model. The present inventive method makes use of the N4SID numerical algorithm. The objective of the algorithm is to determine the order n of the system, and the system matrices $A \in \mathfrak{R}^{n \times n}$, $B \in \mathfrak{R}^{n \times P}$, $C \in \mathfrak{R}^{R \times n}$, $D \in \mathfrak{R}^{R \times P}$, $Q \in \mathfrak{R}^{n \times n}$, $R \in \mathfrak{R}^{R \times R}$, and $S \in \mathfrak{R}^{n \times R}$ (and the Kalman gain matrix K if required), without any prior knowledge of the structure of the system. This is achieved in two main steps: First, model order n and a Kalman filter state sequence of estimates $\hat{x}_i$, $\hat{x}_{i+1}, \ldots, \hat{x}_{i+j}$ are determined by projecting row spaces of data block Hankel matrices, and then applying a singular value decomposition. Next, the solution of a least squares problem is used to obtain the state space matrices A, B, C, and D.

PSO is a heuristic search-based optimzation technique which exhibits behavior of swarm intelligence. PSO differs from other evolutionary algorithms (EAs) in that it changes its population from one iteration to the next. Unlike genetic algorithms (GAs) and other EAs, operators like selection, mutation and crossover are not used to change the population.

Existing particles are, instead, modified according to a pair of formulae. PSO thus differs from other EAs in terms of performance. PSO is more robust and faster in comparison, and also provides solutions to complex and nonlinear problems, with relative ease in finding a global minimum. The convergence characteristic of PSO is relatively stable and provides solutions in relatively little time.

PSO begins with a population of particles. Each particle adjusts its position according to its own experience, as well as by the experience of neighboring particles. Each particle is treated as a point in D-dimensional space. The $i^{th}$ particle is represented as:

$$X_i=(x_{i1},x_{i2},\ldots,x_{iD}) \quad (8)$$

and the best positions of the particles (the position giving the most optimum solution) are recorded as:

$$P_i=(p_{i1},p_{i2},\ldots,p_{iD}) \quad (9)$$

with the change in position (velocity) of each particle being given as:

$$V_i=(v_{i1},v_{i2},\ldots,v_{iD}) \quad (10)$$

where the velocity and positions of the particles are updated according to the following pair of equations:

$$V_i^{n+1}=V_i^n+c_1*r_{i1}^{n}*(P_i^n-X_i^n)+c_2*r_{i2}^{n}*(P_g^n-X_i^n) \quad (11a)$$

$$X_i^{n+1}=X_i^n+x*V_i^{n+1} \quad (11b)$$

where $c_1$ and $c_2$ are two positive real constants, the cognitive parameter and the social parameter, respectively. The value of $c_1$ signifies how much a particle trusts its past experiences, and how much it searches for solutions around the local best position, while the value of $c_2$ determines the swarm's attraction toward a global best position.

Higher values of $c_1$ and $c_2$ make the swarm able to react faster to changes, whereas lower values of these parameters make the swarm slower in changing neighborhoods of solutions. The present inventive method makes use of values such that $c_1 \geq c_2$, and $c_1+c_2 \leq 4$.

Introducing an inertia weight w and a constriction factor X, the update equations become:

$$V_i^{n+1}=X(wV_i^n+c_1*r_{i1}^{n}*(P_i^n-X_i^n)+c_2*r_{i2}^{n}*(P_g^n-X_i^n)) \quad (12a)$$

$$X_i^{n+1}=X_i^n+x*V_i^{n+1} \quad (12b)$$

where w is the inertial weight, and X is the constriction factor, which is used to limit the velocity and help better convergence. The value of $c_1$ signifies how much a particle trusts its past experiences, and how much it is attracted to a local best position while the value of $c_2$ determines the swarm's attraction towards a global best position.

The method relates to Hammerstein model identification, which, in essence, can be summarized as follows: Given a set of N noisy inputs $u(t)_{t=0}^{N-1}$ and outputs $y(t)_{t=0}^{N-1}$, find the weights of the RBFNN; and find the matrices of the state space model. Since the output y(t) is nonlinear in relation to the input u(t), the calculations are nontrivial. Thus, a recursive algorithm is utilized to update the weights of the neural network for each set of input and output data.

Figure 4:
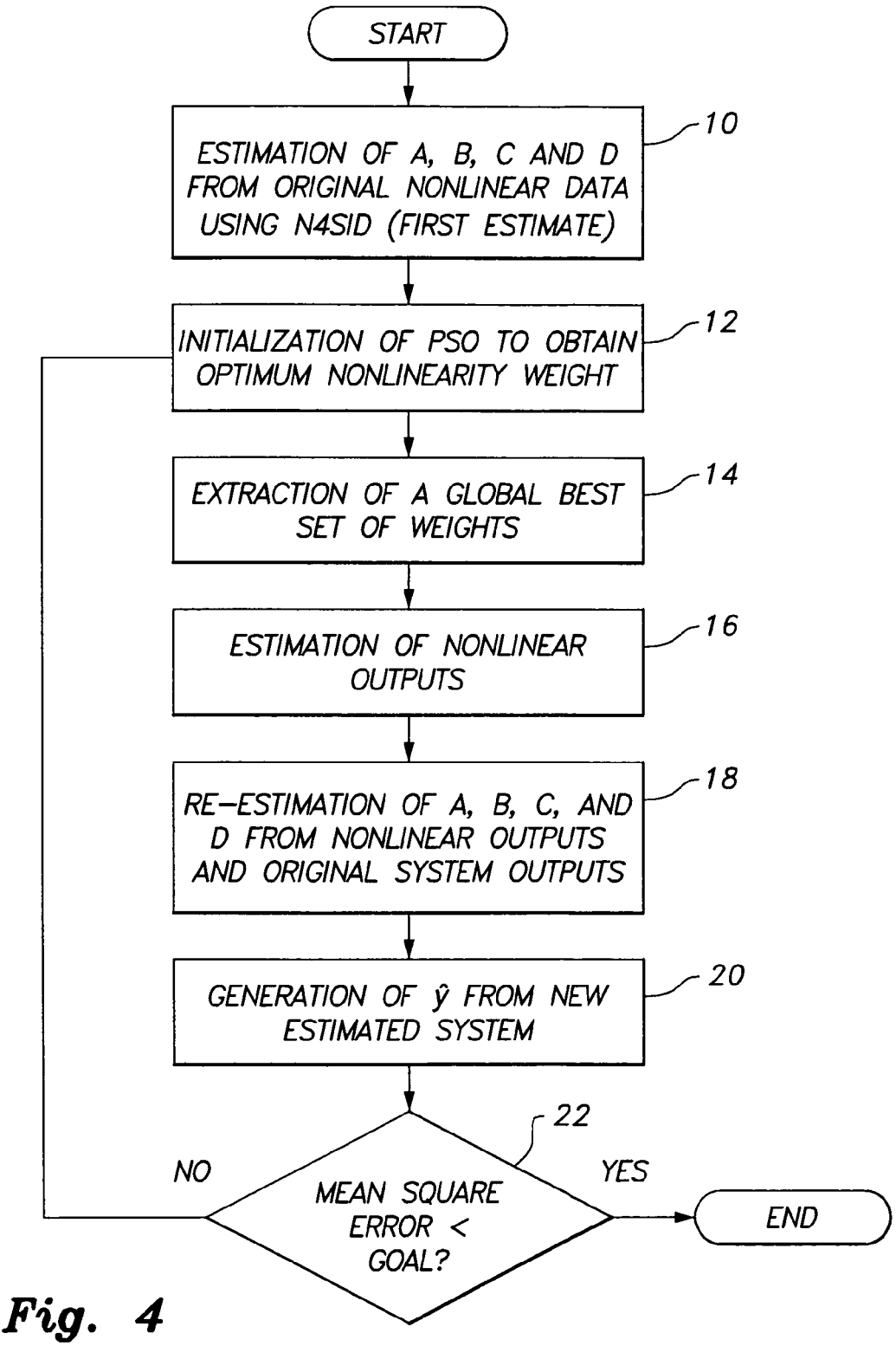
FIG. 4 is a flow chart illustrating the method for identifying multi-input multi-output Hammerstein models according to the present invention.
Figure 5:
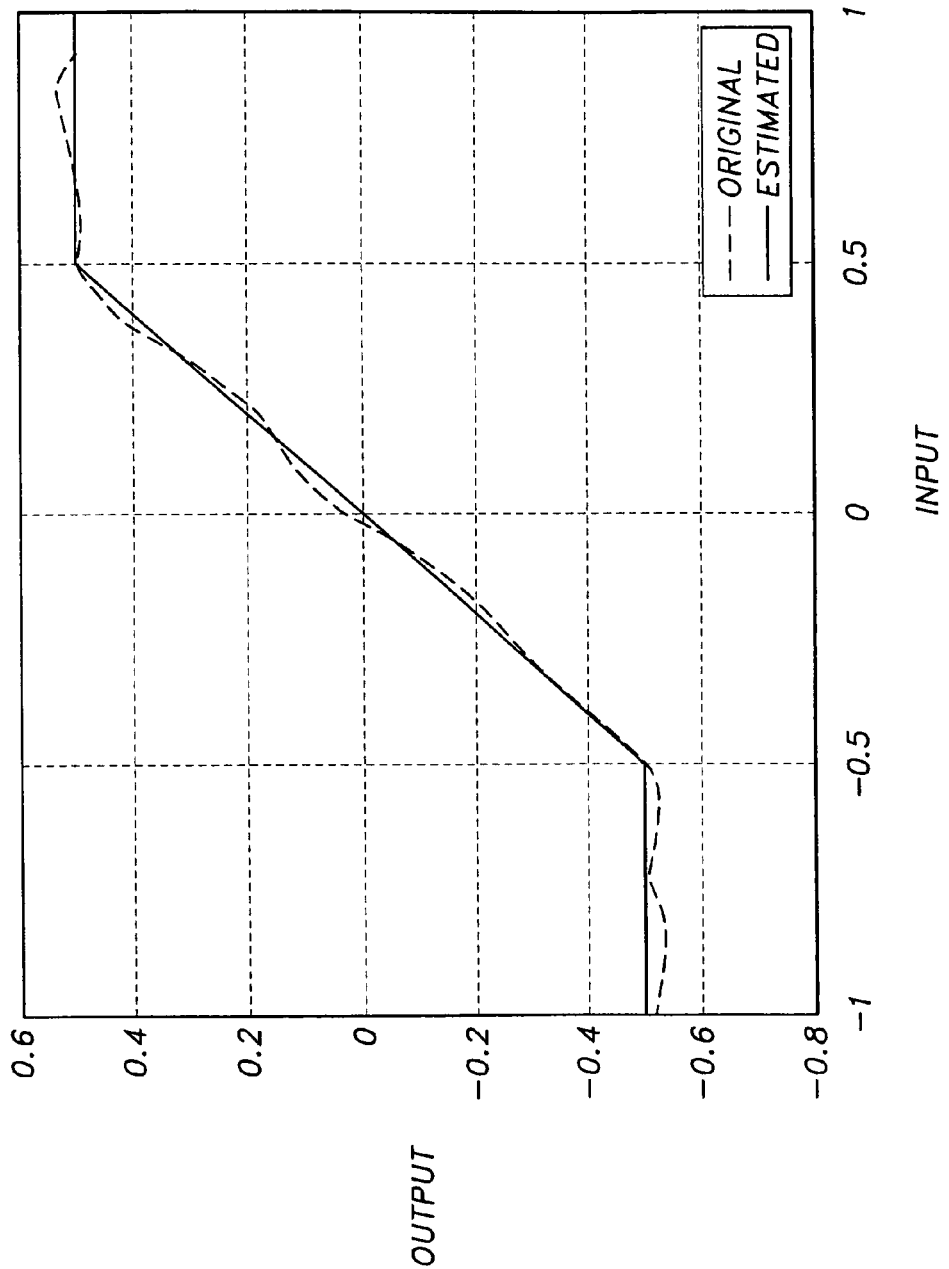
FIG. 5 is a graph illustrating a first nonlinearity of a Hammerstein model associated with a first example of the method for identifying multi-input multi-output Hammerstein models according to the present invention.
Figure 6:
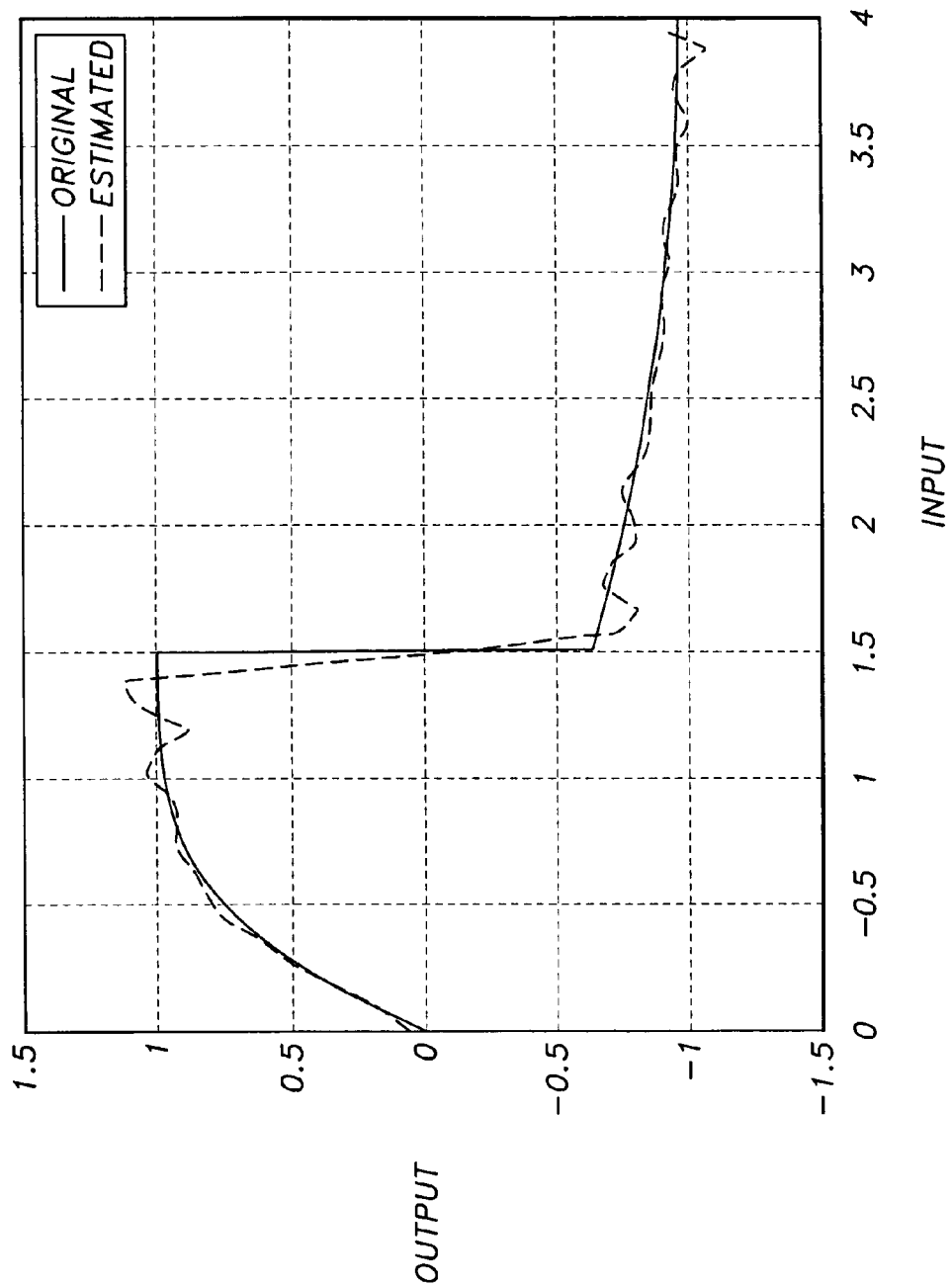
FIG. 6 is a graph illustrating a second nonlinearity of a Hammerstein model associated with a first example of the method for identifying multi-input multi-output Hammerstein models according to the present invention.
Figure 7:
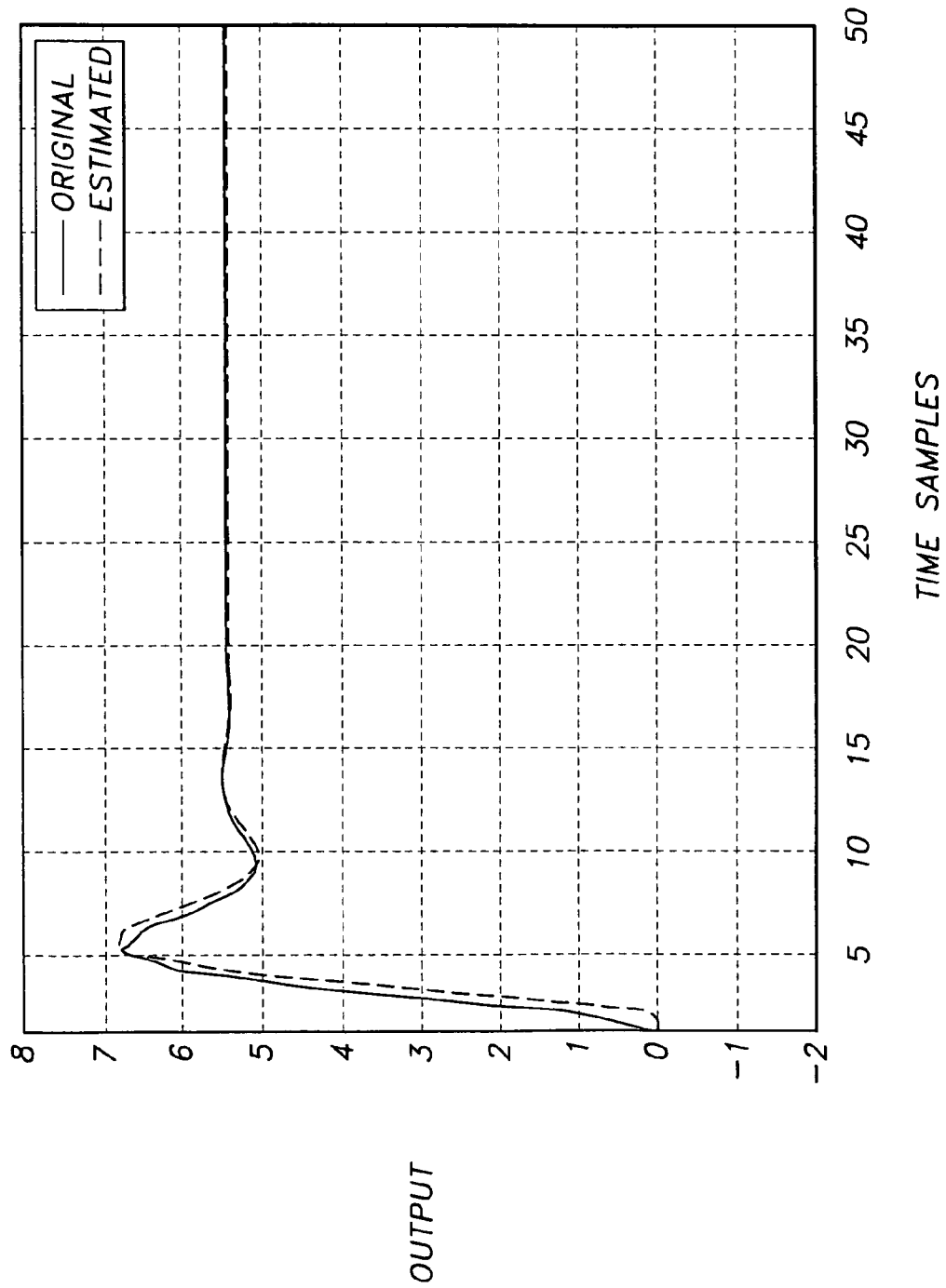
FIG. 7 is a graph illustrating a step response of a linear subsystem of the Hammerstein model associated with the first example of the method for identifying multi-input multi-output Hammerstein models according to the present invention, specifically identifying a first output.
Figure 8:
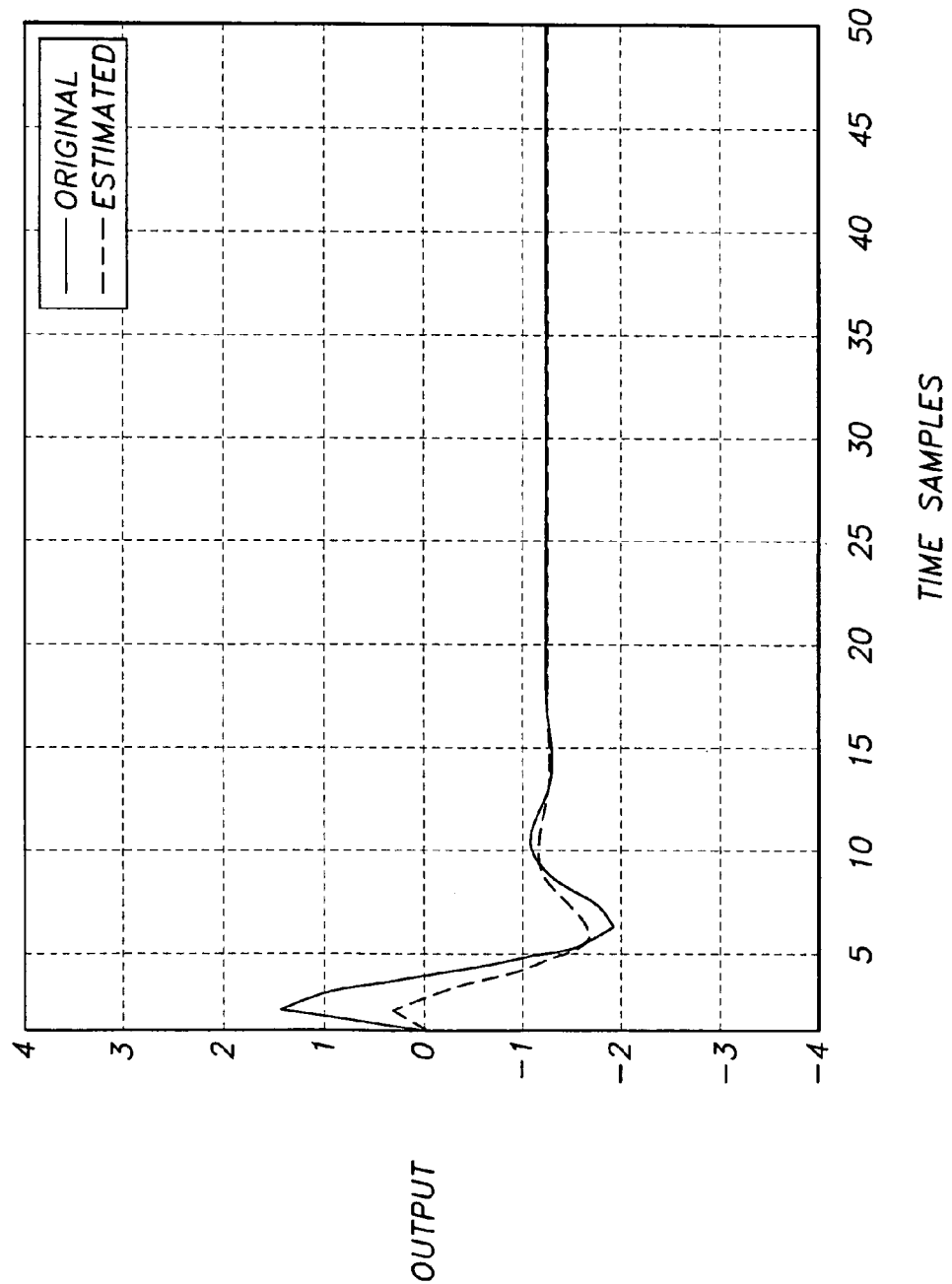
FIG. 8 is a graph illustrating a step response of a linear subsystem of the Hammerstein model associated with the first example of the method for identifying multi-input multi-output Hammerstein models according to the present invention, specifically identifying a second output.

As illustrated in FIG. 4, the method includes the following steps: (1) Estimation of state-space matrices A, B, C and D from original nonlinear data using N4SID subspace identification (i.e., an initial estimate) at step 10; (2) initialization of PSO with random population of possible RBFNN weights (step 12); (3) obtaining a global best set of weights which minimizes the cost index given in equation (5) at step 14; (4) estimation of sets RBFNN outputs v(t) for all values of t once optimum weights are obtained (step 16); (5) estimation of state-space matrices A, B, C, and D from the new neural network outputs estimated in step (4) and sets of original system outputs y(t) for all values of t (this estimate of state-space model is an improvement on the previous estimate); (6) regeneration of sets of output ŷ(t) for all values of t from the new estimate of the complete system; and (7) repetition of steps (2) to (6) if the minimum goal for cost is not reached at step 22.

In a first example, a two input, two output Hammerstein type nonlinear process with two separate static nonlinearities is considered. The first nonlinearity is a saturation nonlinearity, while the second nonlinearity is a tan h/exponential function:

$$v_1(t) = \begin{cases} -0.5 & \text{if } -0.5 \geq u_1(t) \\ u_1(t) & \text{if } 0.5 > u_1(t) > -0.5 \\ 0.5 & \text{if } u_1(t) > 0.5 \end{cases} \quad (13a)$$

$$v_2(t) = \tanh[2u_2(t)] \quad (13b)$$
$$1.5 \geq u(t)$$

$$v_2(t) = \frac{\exp(u_2(t))-1}{\exp(u_2(t))+1} \quad (13c)$$
$$4 > u(t) > 1.5$$

with the dynamic linear part being given by the following second-order discrete time state-space system:

$$\begin{bmatrix} x_1(t+1) \\ x_2(t+1) \end{bmatrix} = \begin{bmatrix} 1 & 1 \\ -0.5 & 0 \end{bmatrix}\begin{bmatrix} x_1(t) \\ x_2(t) \end{bmatrix}\begin{bmatrix} 1 \\ 0.5 \end{bmatrix}v(t)$$

$$y(t) = [1 \quad 0]\begin{bmatrix} x_1(t) \\ x_2(t) \end{bmatrix}$$

where the linear part of the system has eigen values at $\lambda_{1,2}=0.5\pm 0.5i$.

Figure 9:
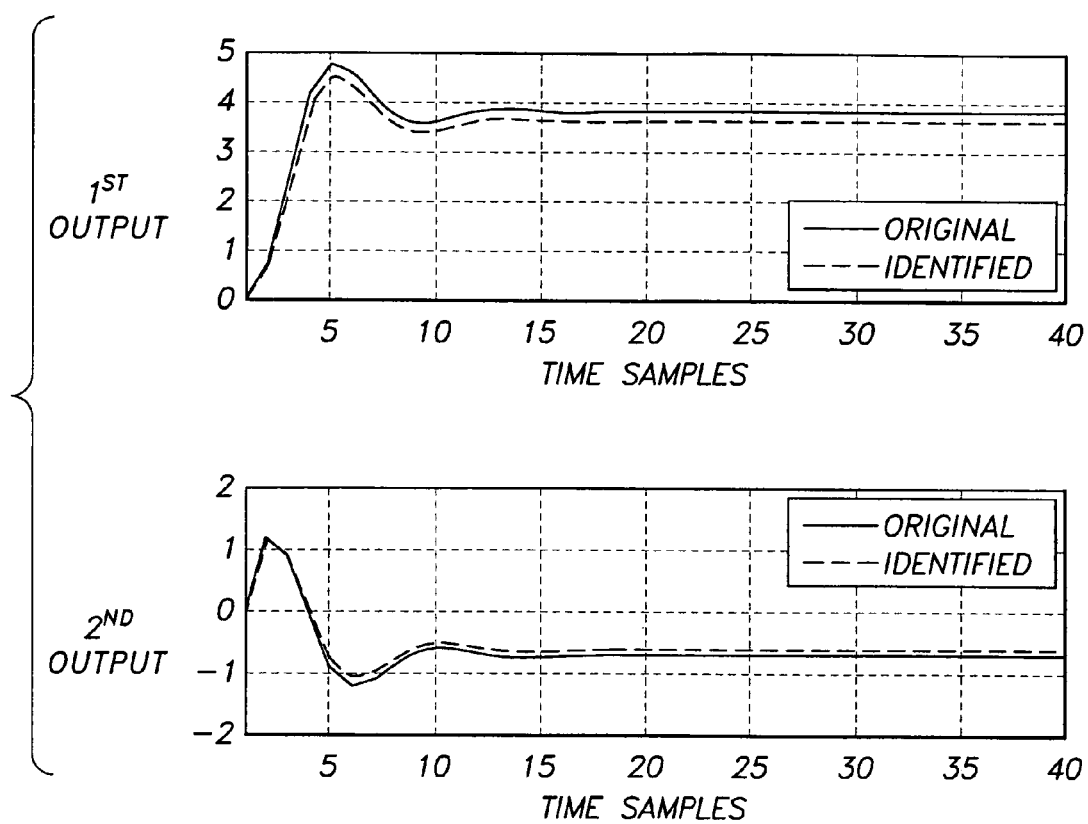
FIG. 9 is a graph illustrating a complete step response of the Hammerstein model associated with the first example of the method for identifying multi-input multi-output Hammerstein models according to the present invention.
Figure 10:
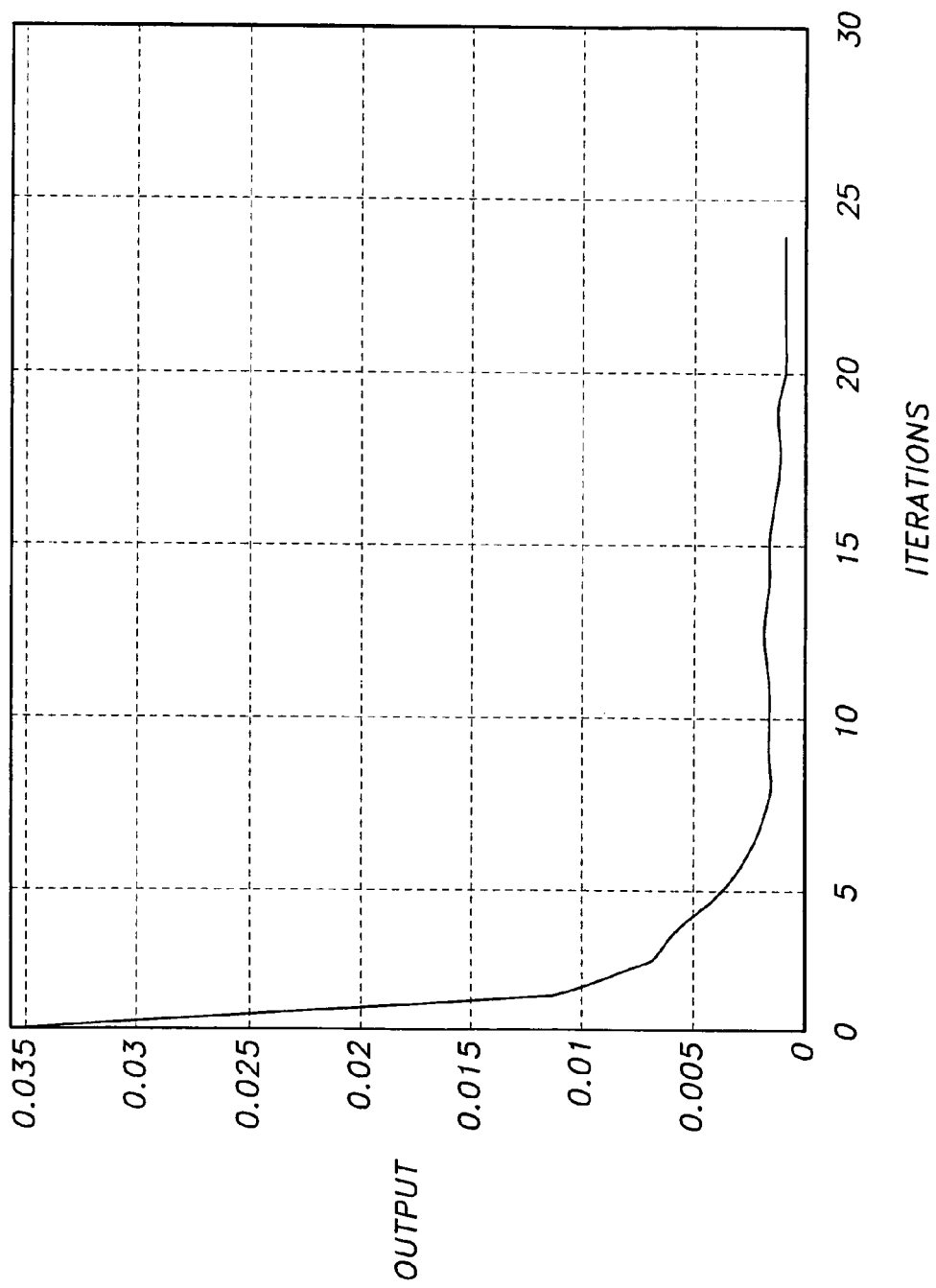
FIG. 10 is a graph illustrating a mean squared output error of the Hammerstein model associated with the first example of the method for identifying multi-input multi-output Hammerstein models according to the present invention.
Figure 11:
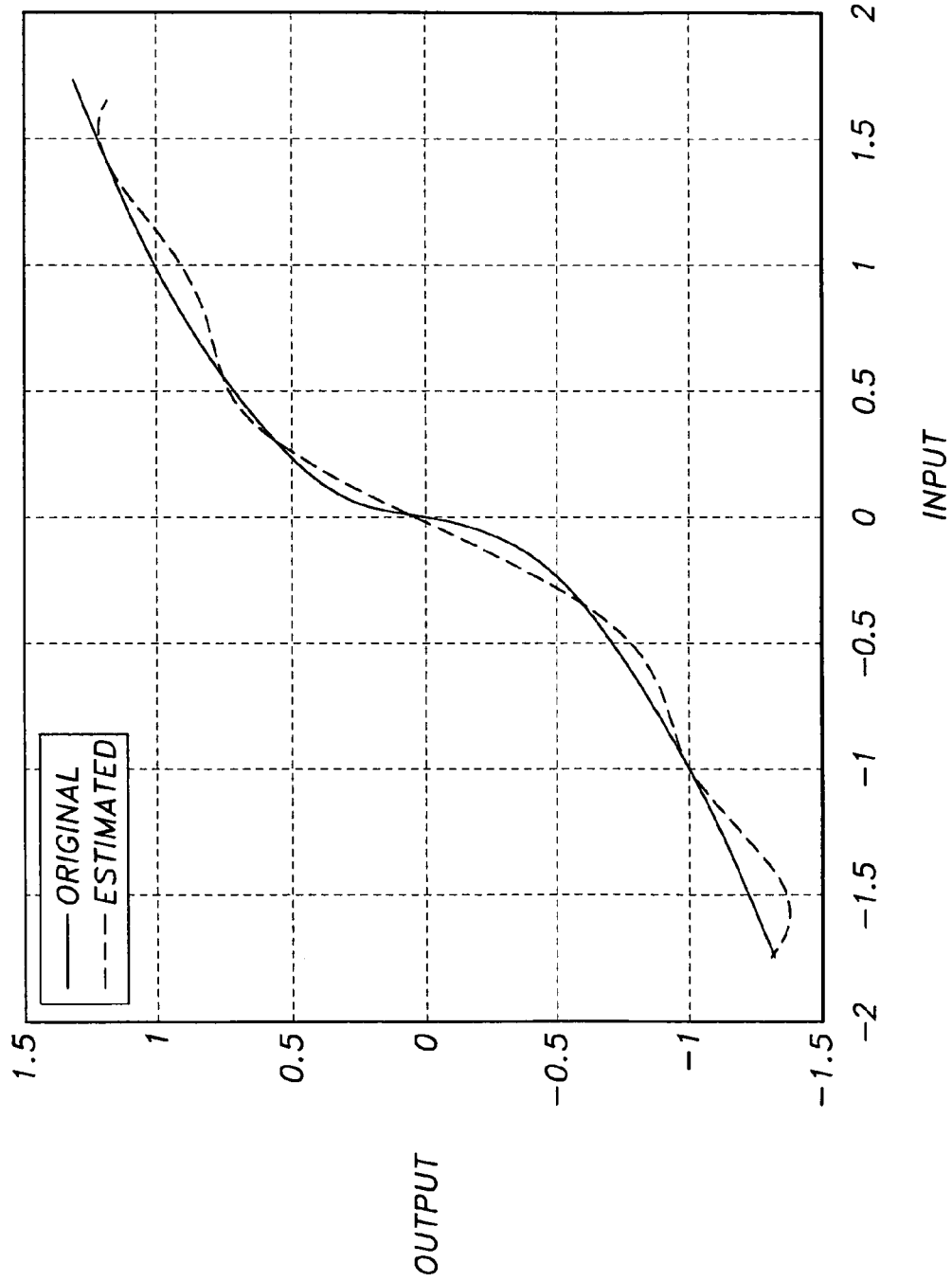
FIG. 11 is a graph illustrating a first nonlinearity of a Hammerstein model associated with a second example of the method for identifying multi-input multi-output Hammerstein models according to the present invention.
Figure 12:
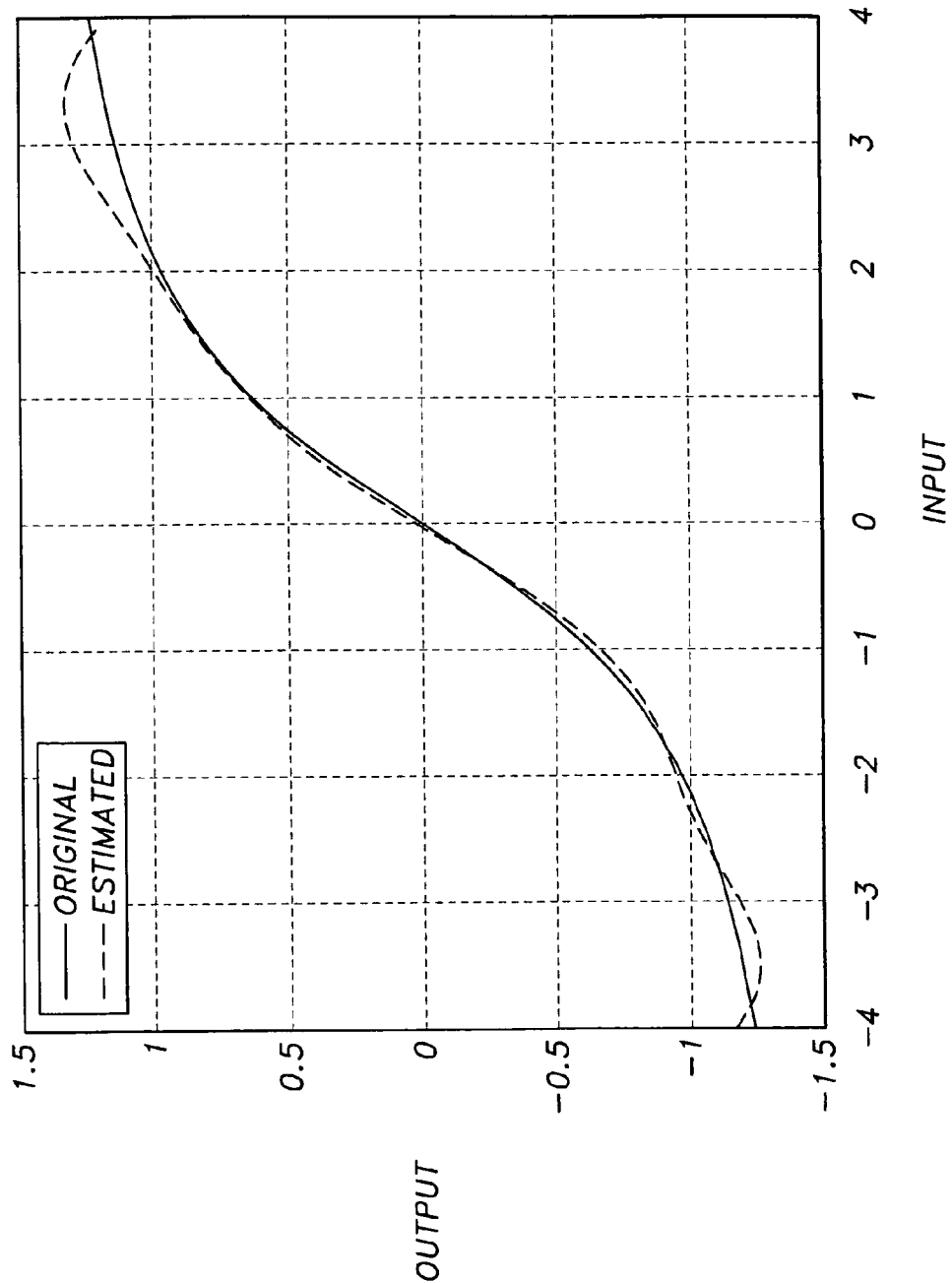
FIG. 12 is a graph illustrating a second nonlinearity of a Hammerstein model associated with the second example of the method for identifying multi-input multi-output Hammerstein models according to the present invention.
Figure 13:
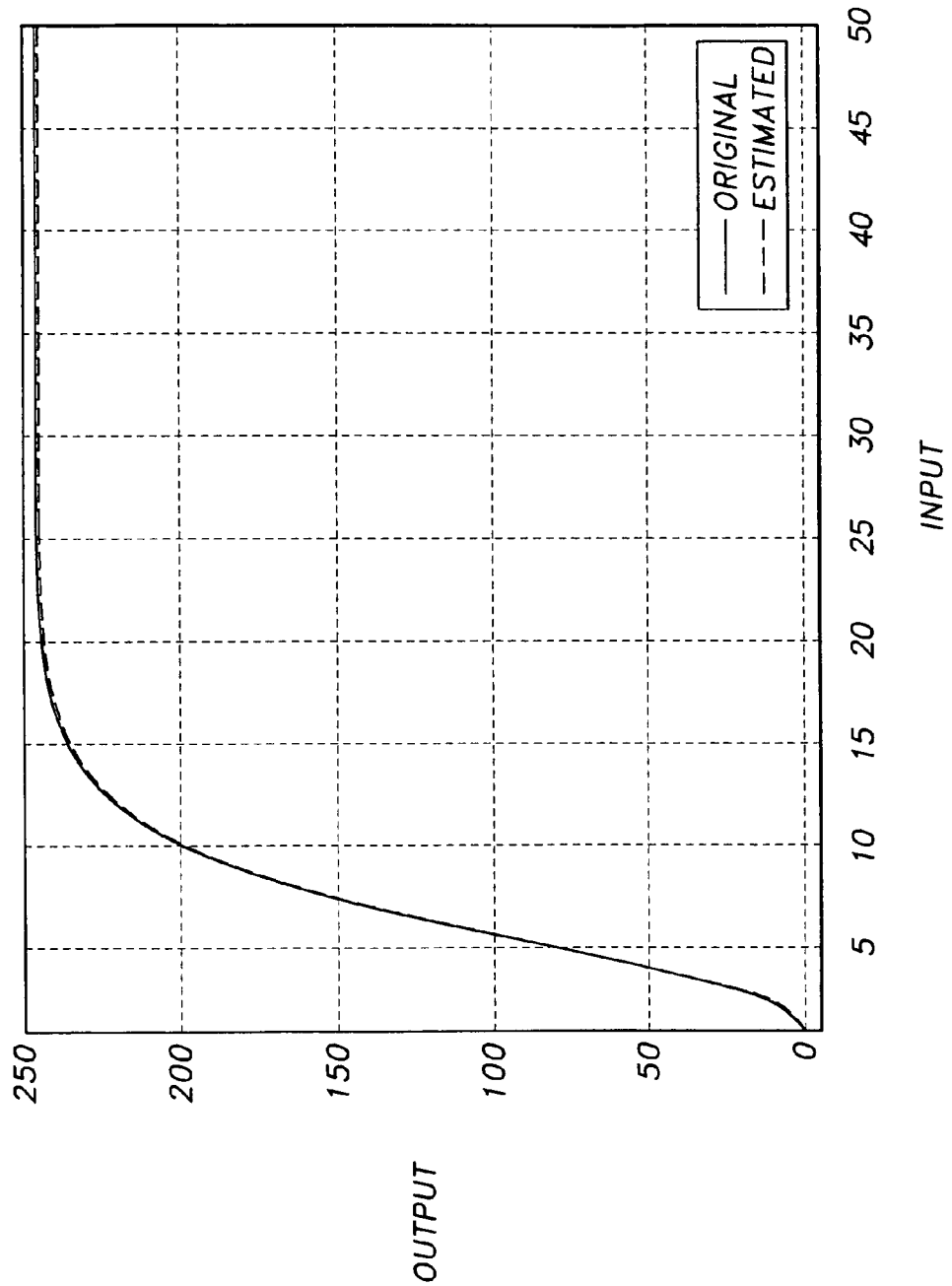
FIG. 13 is a graph illustrating a step response of a linear subsystem of the Hammerstein model associated with the second example of the method for identifying multi-input multi-output Hammerstein models according to the present invention, specifically identifying a first output.
Figure 14:
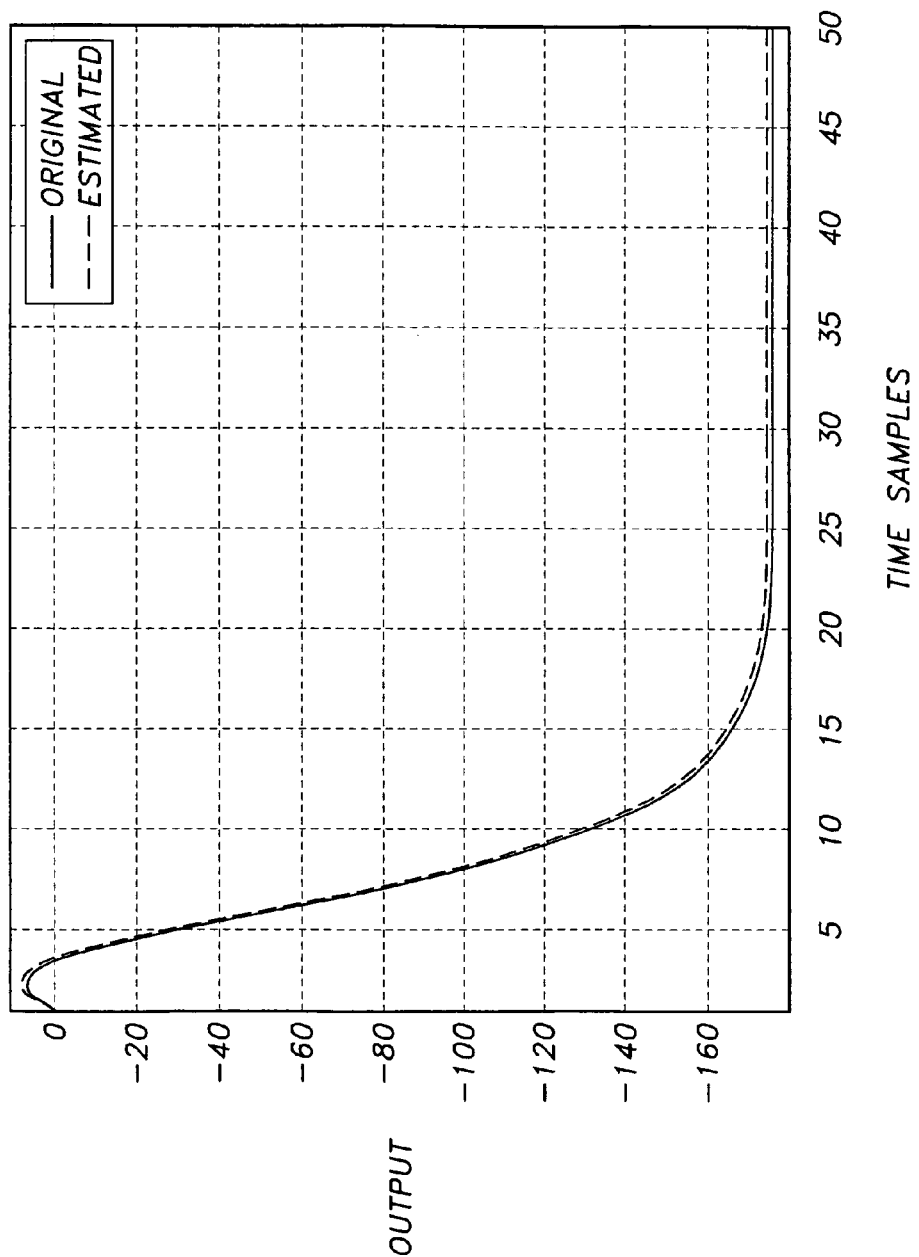
FIG. 14 is a graph illustrating a step response of a linear subsystem of the Hammerstein model associated with the second example of the method for identifying multi-input multi-output Hammerstein models according to the present invention, specifically identifying a second output.

The system is identified using a PSO/subspace algorithm. A set of persistently exciting data is generated in the intervals [−1,1] and [0,4] for the two inputs, respectively. The centers of the RBFNNs are initialized with a set of evenly distributed centers in their respective intervals. The PSO/subspace algorithm identifies the system within a few iterations of the algorithm and the mean squared error converges to a final value of $9\times 10^{-4}$. FIGS. 5, 6, 7 and 8 show the estimates of nonlinearities and the step response of the dynamic linear subsystem. FIG. 9 shows the step response of the complete Hammerstein system. The results show that the shape of the nonlinearies have been accurately estimated. The eigenvalues of the estimated linear part are $\lambda_1=0.4970\pm 0.4993i$.

In a second example of the method, the Hammerstein type nonlinear process includes a static nonlinearity given by:

$$v_1(t)\sin(u(t))\sqrt{|u(t)|} \quad (14a)$$

$$v_2(t) = \arctan\left(\frac{u_2}{1.4}\right) \quad (14b)$$

with the dynamic linear part being given by a third-order discrete time state-space system:

$$\begin{bmatrix} x_1(t+1) \\ x_2(t+1) \\ x_3(t+1) \end{bmatrix} = \begin{bmatrix} 1.80 & 1 & 0 \\ -1.07 & 0 & 1 \\ 0.21 & 0 & 0 \end{bmatrix} \begin{bmatrix} x_1(t) \\ x_2(t) \\ x_3(t) \end{bmatrix} + \begin{bmatrix} 4.80 \\ 1.93 \\ 1.21 \end{bmatrix} v(t) \quad (15a)$$

$$y(t) = \begin{bmatrix} 1 & 0 & 0 \\ 0 & 1 & 0.5 \end{bmatrix} \begin{bmatrix} x_1(t) \\ x_2(t) \\ x_3(t) \end{bmatrix} \quad (15b)$$

where, for this example, an RBF network of ten neurons is initialized with centers evenly distributed in the interval [−1.75,1.75]. The linear part of the system has eigen values at $\lambda_1=0.7$, $\lambda_2=0.6$, and $\lambda_3=0.5$.

Persistently exciting data is generated in the intervals [−1.75,1.75] and [−4,4] for the two inputs, respectively. The centers of the RBFNNs are initialized evenly distributed within the input intervals. The PSO/subspace method identifies the system with a good estimate of the nonlinearity shape. The mean squared error converges to a final value of $7 \times 10^{-4}$. FIGS. 11, 12, 13, and 14 show the estimates of nonlinearities and the step responses of the linear subsystem. The eigenvalues of the estimated linear subsystem are $\lambda_1=0.6997$, $\lambda_2=0.5952$, and $\lambda_3=0.4949$.

Figure 15:
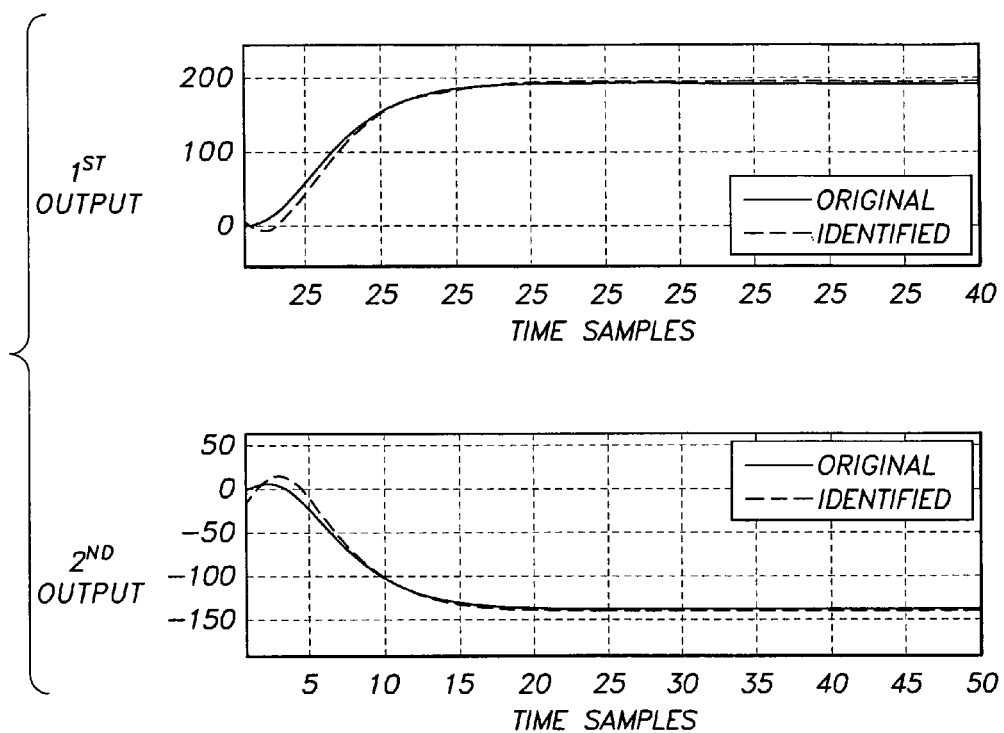
FIG. 15 is a graph illustrating a complete step response of the Hammerstein model associated with the second example of the method for identifying multi-input multi-output Hammerstein models according to the present invention.
Figure 16:
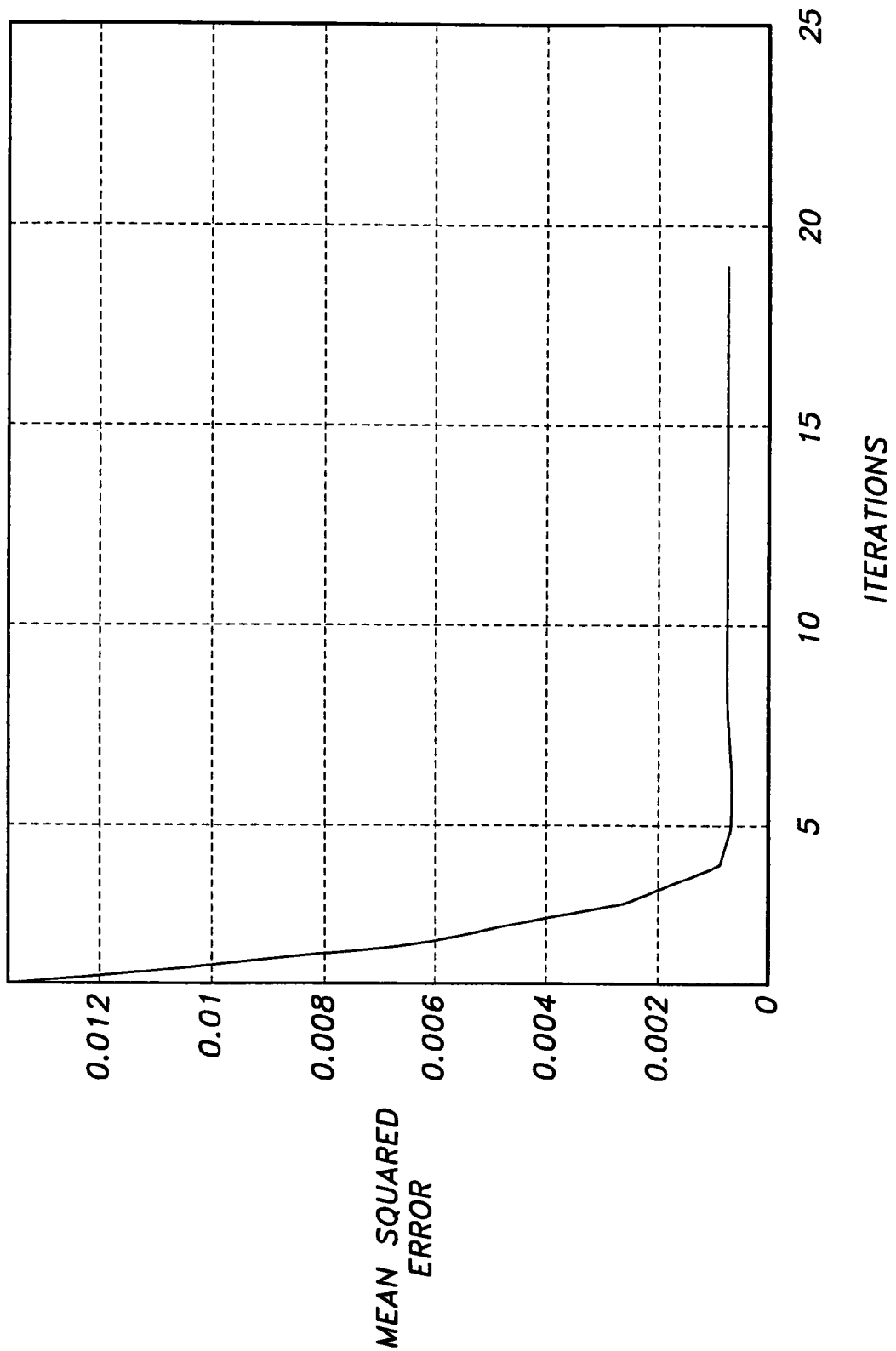
FIG. 16 is a graph illustrating a mean squared output error of the Hammerstein model associated with the second example of the method for identifying multi-input multi-output Hammerstein models according to the present invention.

As seen from the plots, the shapes of the nonlinearities have been estimated quite accurately. The method combines the advantages of PSO with those of state-space models. PSO is well know to outperform other EAs in finding global optima, and state-space models can more easily be extended to systems with multiple inputs and outputs, as compared to polynomial models. FIG. 15 illustrates the step response of the complete system of the second example, and FIG. 16 illustrates the mean squared output error for the Hammerstein system of the second example.

Figure 17:
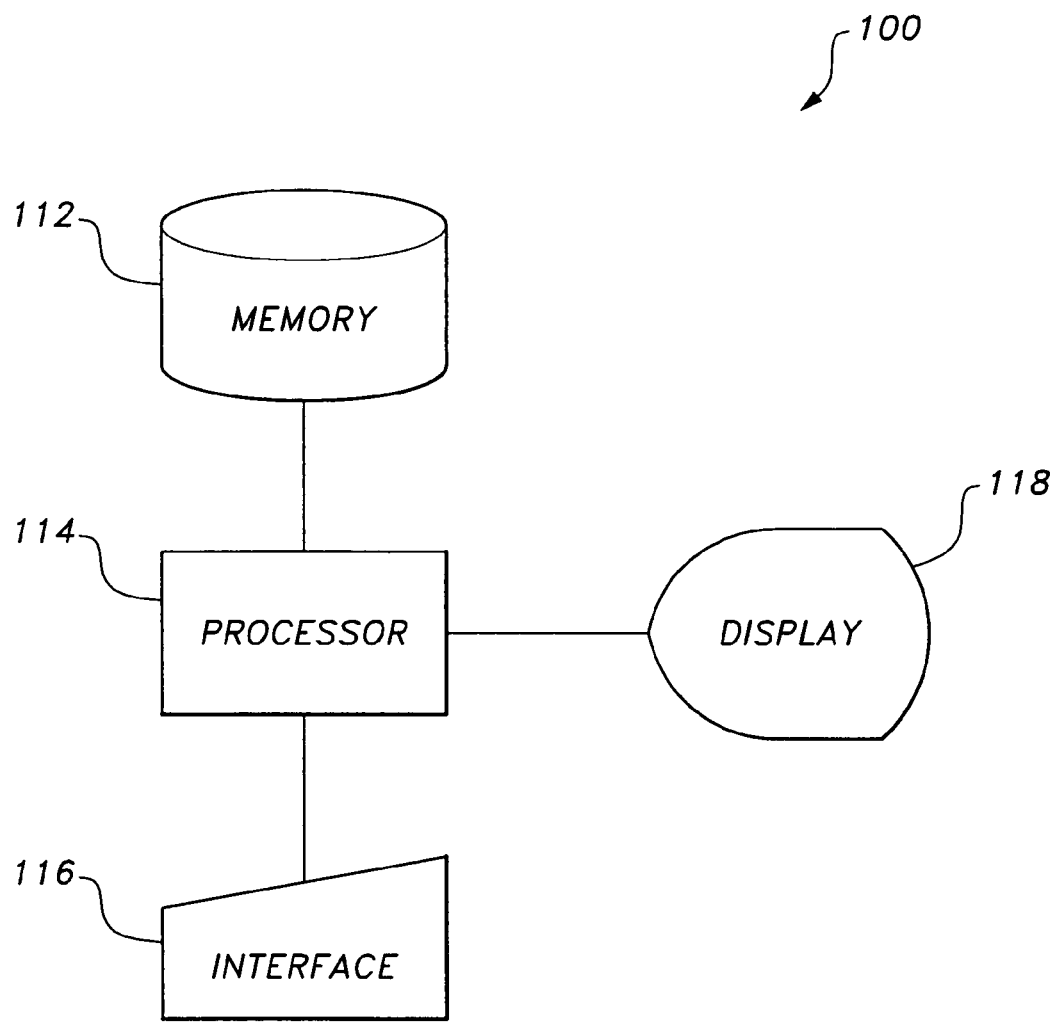
FIG. 17 is a block diagram of a system for implementing the method for identifying multi-input multi-output Hammerstein models according to the present invention.

In the above, the calculations may be performed by any suitable computer system, such as that diagrammatically shown in FIG. 17. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media and/or communication transmission media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus, which may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method for identifying multi-input multi-output Hammerstein models, comprising the steps of:
   (a) providing an initial set of nonlinear Hammerstein system data acquired from a plant;
   (b) estimating a set of state-space matrices A, B, C and D from the initial set of nonlinear Hammerstein system data;
   (c) initializing a swarm of particles with a random population of possible radial basis function neural network weights;
   (d) calculating a global best set of weights which minimizes an output error measure;
   (e) estimating sets of radial basis function neural network outputs v(t) for all values of t based upon the global best set of weights;
   (f) estimating the state-space matrices A, B, C and D from the radial basis function neural network outputs v(t) for all values of t, estimated in step (e), and sets of original system outputs y(t) for all values of t;
   (g) calculating sets of system outputs ŷ(t) for all values of t from the estimated state-space matrices A, B, C and D of step (f);
   (h) calculating the output error measure; and
   (i) repeating steps (c) to (h) if the calculated output error measure is greater than a pre-selected threshold error measure.

2. The method for identifying multi-input multi-output Hammerstein models as recited in claim 1, wherein the set of state-space matrices are estimated by calculating x(t+1)=Ax(t)+Bv(t)+s(t) and ŷ(t)=Cx(t)+Dv(t)+z(t), wherein x(t) represents an input of the Hammerstein system and ŷ(t) represents an output of the Hammerstein system observed at a discrete time instant t, z(t) represents a measurement noise, and s(t) represents a process noise.

3. The method for identifying multi-input multi-output Hammerstein models as recited in claim 2, wherein the output error measure I is calculated as $$I = \sum_{t=1}^{N} e^T(t)e(t),$$

wherein N represents a number of noisy inputs, and e(t) is a vector for output error at discrete time instant t, where e(t)=Y(t)−Ŷ(t).

4. The method for identifying multi-input multi-output Hammerstein models as recited in claim 3, wherein the radial basis function neural network outputs are calculated as $$v(t) = \sum_{i=1}^{Q} w_i \phi \|u(t) - c_i\|,$$

wherein $c_i$ represents a center for an $i^{th}$ neuron, wherein i is an integer, Q represents a number of neurons in a hidden layer of the neural network, $w_i$ represents a weight connecting the $i^{th}$ neuron node to an output layer, and $\phi$ represents a radial basis function.

5. The method for identifying multi-input multi-output Hammerstein models as recited in claim 4, wherein the particle swarm optimization method includes establishing a set of particles and identifying each particle in the set as a point in D-dimensional space, wherein the $i^{th}$ particle is represented as $X_i=(x_{i1}, x_{i2}, \ldots, x_{iD})$ and the most optimal positions of the particles are given by $P_i=(p_{i1}, p_{i2}, \ldots, p_{iD})$ with a change in velocity of each of the particles being given by $V_i=(v_{i1}, v_{i2}, \ldots, v_{iD})$, such that the velocity and position of each particle is updated as $V_i^{n+1}=w*V_i^n+c_1*r_{i1}^n*(P_i^n-X_i^n)+c_2*r_{i2}^n*(P_g^n-X_i^n)$ and $X_i^{n+1}=X_i^n+x*V_i^{n+1}$, wherein w is an inertial weight parameter for limiting velocity, and $c_1$ and $c_2$ represent a cognitive parameter and a social parameter, respectively.

6. A system for identifying Hammerstein models, comprising:
   a processor;
   computer readable memory coupled to the processor;
   a user interface coupled to the processor;
   a display coupled to the processor
   software stored in the memory and executable by the processor, the software having:
   means for estimating a set of state-space matrices A, B, C and D from an initial set of nonlinear Hammerstein system data acquired from a plant;
   means for initializing a swarm of particles with a random population of possible radial basis function neural network weights;
   means for calculating a global best set of weights which minimizes an output error measure;
   means for estimating sets of radial basis function neural network outputs v(t) for all values of t based upon the global best set of weights;
   means for estimating the state-space matrices A, B, C and D from the radial basis function neural network outputs v(t) for all values of t, and sets of original system outputs y(t) for all values of t;
   means for calculating sets of system outputs $\hat{y}(t)$ for all values of t from the estimated state-space matrices A, B, C and D; and
   means for calculating the output error measure.

7. A computer software product that includes a non-transitory storage medium readable by a processor, the non-transitory storage medium having stored thereon a set of instructions for identifying Hammerstein models, the instructions comprising:

(a) a first sequence of instructions which, when executed by the processor, causes the processor to acquire an initial set of nonlinear system from a plant;
(b) a second sequence of instructions which, when executed by the processor, causes the processor to estimate a set of state-space matrices A, B, C and D from the initial set of nonlinear data using subspace identification;
(c) a third sequence of instructions which, when executed by the processor, causes the processor to initialize a swarm of particles with a random population of possible radial basis function neural network weights;
(d) a fourth sequence of instructions which, when executed by the processor, causes the processor to calculate a global best set of weights which minimizes an output error measure;
(e) a fifth sequence of instructions which, when executed by the processor, causes the processor to estimate sets of radial basis function neural network outputs v(t) for all values of t based upon the global best set of weights;
(f) a sixth sequence of instructions which, when executed by the processor, causes the processor to estimate the state-space matrices A, B, C and D from the radial basis function neural network outputs v(t) for all values of t, estimated in the fifth set of instructions, and sets of original system outputs y(t) for all values of t,
(g) a seventh sequence of instructions which, when executed by the processor, causes the processor to calculate sets of system outputs $\hat{y}(t)$ for all values of t from the estimated state-space matrices A, B, C and D of the sixth sequence of instructions;
(h) an eighth sequence of instructions which, when executed by the processor, causes the processor to calculate the output error measure; and
(i) a ninth sequence of instructions which, when executed by the processor, causes the processor to repeat the third sequence of instructions of the eighth sequence of instructions if the calculated output error measure is greater than a pre-selected threshold error measure.

* * * * *